United States Patent [19]

Dalferth

[11] Patent Number: 4,512,551

[45] Date of Patent: Apr. 23, 1985

[54] DEVICE FOR RELEASING THE FLOW OF WATER IN A WATER FAUCET

[76] Inventor: Gotthilf R. Dalferth, Auf den Felsen 25, D-7140 Ludwigsburg-Poppenweiler, Fed. Rep. of Germany

[21] Appl. No.: 505,154

[22] Filed: Jun. 9, 1983

[30] Foreign Application Priority Data

Jun. 11, 1982 [DE] Fed. Rep. of Germany ....... 3222004

[51] Int. Cl.³ ............................................ F16K 31/254
[52] U.S. Cl. .................................... 251/339; 251/251
[58] Field of Search ............... 251/339, 354, 349, 293, 251/291, 229, 251, 237, 252–259, 262, 247; 222/509; 119/72.5, 75; 239/577, 582, 578, 428.5

[56] References Cited

U.S. PATENT DOCUMENTS

| | | | |
|---|---|---|---|
| 267,103 | 11/1882 | Pierce | 251/330 |
| 2,785,881 | 3/1957 | Dolan | 239/428.5 |
| 3,513,811 | 5/1970 | Graham | 119/72.5 |
| 3,887,165 | 6/1975 | Thompson . | |
| 4,133,345 | 1/1970 | Mitchell . | |

FOREIGN PATENT DOCUMENTS

| | | |
|---|---|---|
| 714423 | 11/1941 | Fed. Rep. of Germany . |
| 1199564 | 8/1965 | Fed. Rep. of Germany . |
| 1815553 | 7/1969 | Fed. Rep. of Germany . |
| 2522714 | 5/1975 | Fed. Rep. of Germany . |
| 7616214 | 10/1976 | Fed. Rep. of Germany . |
| 2755665 | 6/1978 | Fed. Rep. of Germany . |
| 2721154 | 11/1978 | Fed. Rep. of Germany . |
| 2721217 | 11/1978 | Fed. Rep. of Germany . |
| 2721225 | 11/1978 | Fed. Rep. of Germany . |
| 2721254 | 11/1978 | Fed. Rep. of Germany . |
| 3025603 | 2/1982 | Fed. Rep. of Germany . |
| 3035935 | 2/1982 | Fed. Rep. of Germany . |
| 248591 | 5/1947 | Switzerland . |
| 2041498 | 9/1980 | United Kingdom . |

Primary Examiner—Martin P. Schwadron
Assistant Examiner—John S. Starsiak, Jr.
Attorney, Agent, or Firm—Thomas W. Speckman

[57] ABSTRACT

A device for releasing the flow of water in a water faucet including switching means adapted to be actuated by the movement of the hands to be washed into the area under the discharge head of the water faucet. To install the device in already existing water faucets in a simple and safe manner, the invention provides for the switching device to be disposed in a hollow cylindrical casing having an inlet and an outlet opening and being connectible in the region of the inlet opening with the discharge head of the water faucet. The switching device is in the form of a switch valve comprising a valve body seated in a valve seat on the side facing the outlet opening. The valve body is adapted to be lifted off the valve seat by the action of an operating lever projecting from the discharge opening of the casing.

17 Claims, 1 Drawing Figure

U.S. Patent    Apr. 23, 1985    4,512,551
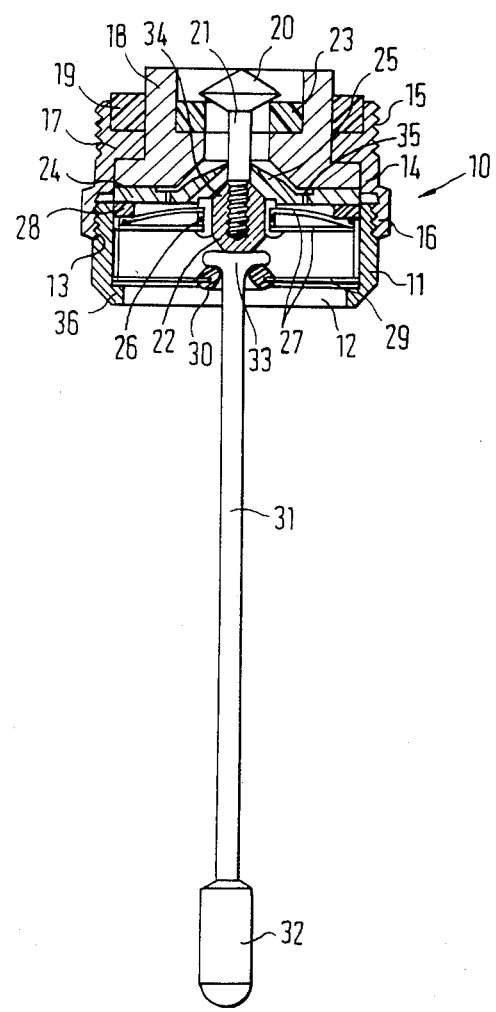

DEVICE FOR RELEASING THE FLOW OF WATER IN A WATER FAUCET

BACKGROUND OF THE INVENTION

1. Field of the Invention

This invention relates to a device for releasing the flow of water in a water faucet in which switch means are provided which are actuated by an operating member projecting from the discharge opening, in which a hollow cylindrical body having an inlet and an outlet opening is connectible to the discharge head of the water faucet, and in which the switching means include a valve member fitted in a valve seat to face the discharge opening and being adapted to be lifted from the valve seat by the action of the operating member.

2. Description of the Prior Art

A device of the foregoing type is known from German patent specification DE-PS No. 714 423. In this prior device, the operating member is fixedly joined to the valve member and is mounted on the casing so as to be adjustable along the longitudinal axis of the casing. To start the water running, the operating member must be raised, thereby causing the valve member to be lifted, so that the discharge opening is exposed which continues to extend inside the hollow actuating member. The operating member is provided with peripheral handles for being taken hold of from the outside of the discharge opening.

This known prior device is suitable merely for starting and stopping the flow of water. It is not suitable, however, for a water faucet in which the flow of water is to be controlled solely by moving the hands to be washed under the discharge opening or spout. The necessity of constantly lifting the operating member is prohibitive of any rubbing of the hands requisite for a proper washing procedure.

In order to reduce the volume of water used during the washing of hands, equipment is required which can be operated as the hands are moved under the spout but which will still permit unlimited rubbing of the hands during the washing procedure.

To this end, various switching devices are available to monitor the movements of the hands into and out of the area below the water faucet spout.

German patent specification DE-OS Nos. 27 21 154, 30 25 603 and 30 35 935 disclose the use of optoelectric switching means installed in the discharge member of the water faucet.

German patent specification DE-OS No. 27 55 665 discloses the use of proximity switches as switching means, and German patent specification Nos. 27 21 217, 27 21 225 and 27 21 254 describe the use of ultrasonic motion detectors as switching means for devices of this type.

Common to all of these prior art devices is that the structural requirements for the switching device are considerable, and that they cannot readily be installed in existing water faucets.

SUMMARY OF THE INVENTION

It is the object of the present invention to provide a device of the aforementioned type which is of simple construction, safe in operation and capable of being easily attached to already installed water faucets and, in particular, in which the operation of the switching device permits an unimpeded rubbing of the hands during the washing process.

This is accomplished according to the invention in that the valve member is separate from the operating member which is in the form of an operating rod or lever, that the end portion of the operating lever facing the valve member is constructed in the form of an operating plate by which the operating lever is securely retained in the casing and which also forms a support for the valve member, and that the operating lever is fitted in the region of its plate in the casing in such a manner that it is movable in any directiom so that any such deflecting motion of the operating lever causes the valve member to be lifted.

The construction of the operating member as an all around movable lever or rod projecting from the discharge orifice has the advantage that there is no need for the hands to grasp the operating lever as the hands are moved under the discharge orifice, but rather, the operating lever is simply being deflected. The hands remain free and can carry out the rubbing motions required for proper washing. As long as the hands are underneath the discharge opening, the operating lever remains deflected and the water can flow freely. When the hands are withdrawn out of this area, the operating lever returns to its perpendicular position and the flow of water is automatically turned off.

The movement of the valve member during the adjustment action may be improved according to one embodiment of the invention in that the valve member is supported by the plate top of the operating lever and the valve stem is axially movable in the case. The preferred construction is such that the valve member on the side facing the valve seat takes the shape of a truncated cone and merges in one piece with the valve stem, that the stem terminates in a threaded portion onto which a plastic cap is screwed which is supported by the plate top of the operating lever, and that the plastic cap is axially movable in a bearing bushing.

According to another embodiment, the construction of the switching device and the valve is such that the valve seat is in the form of a washer inserted into a recessed hole in a packing washer, and that the packing washer is retained in a casing consisting of two threaded sleeves.

If the water faucet has a threaded portion with interior and exterior threads, the attachment of the device according to the invention is achieved in that the threaded sleeve forming the inlet is provided with either an exterior thread or with an interior thread.

Further known are aerators as accessories for water faucets, as they are disclosed in German utility patent DE-GM No. 70 40 611. In one embodiment of the present invention, the device combines with the switch valve by means of such a aerator in that in the casing adjacent the switch valve a perforated plate is inserted for volume control and distribution, and perforated disc sets serving to promote mixing action are disposed in series in the direction of flow, that the stem of the valve member extends through a bore in the perforated plate insert, that the plastic cap covering the bottom end of the stem is enclosed in the bearing bushing disposed in the perforated disc set adjacent the inlet, and that the operating lever is enclosed in a bushing of the perforated disc set adjacent the outlet and is movable in all directions.

To ensure that in the ON position of the switch valve the water flows over the perforated plate insert, another embodiment provides for the plastic cap on the bottom end of the stem of the valve member on the side facing the perforated plate insert to be in the form of a cone-shaped closure by which the bore in the perforated plate insert for receiving the valve stem is sealed when the valve member is in the open position.

The return of the operating lever to the initial perpendicular position is achieved according to another embodiment, in that the free end of the operating lever takes the form of a return weight.

The all around deflectable mounting of the operating lever is achieved in that the bushing in the perforated disc set located near the outlet is oval in cross section and the interior cross section increases toward the discharge opening, and that the merging position between the operating plate and the operating lever is appropriately concavely rounded.

The sealing between the perforated plate insert and the stem of the valve member extending therethrough may be improved in that the perforated plate insert itself is shaped to form a sealing lip around the bore for the valve stem.

Attaching the device to a threadless water faucet is made possible according to one embodiment in that the casing may be attached to the threadless discharge head of a water faucet by means of a clamp adapter. The clamp adapter may include the features disclosed in German utility model patent DE-GM No. 76 16 214.

BRIEF DESCRIPTION OF THE DRAWING

The invention will be described in further detail with reference to one embodiment, shown in section, of a device including a switch valve and an aerator (Perlator).

DESCRIPTION OF THE PREFERRED EMBODIMENTS

In the illustrative embodiment, the device of the invention is in the form of an accessory part which can be attached as a prefabricated unit to the discharge head of the water faucet. The illustrated unit includes in addition to the switch valve also an aerator (Perlator).

The casing 10 of the device consists of the two threaded sleeves 11 and 14. The threaded sleeve 14 constitutes the inlet opening and is screwed with its exterior thread 15 into the interior thread of the discharge head or a screw cap thereon, respectively, the joint being sealed off by the washer 19. If the threaded sleeve 14 has an interior thread in the area of the inlet opening, the device may be directly screwed onto an exteriorly threaded head of a water faucet. Instead of being threaded, sleeve 14 may also be used a clamp adapter so that the device may be securely attached to the threadless discharge head of a water faucet.

The threaded sleeve 14 terminates in an interior thread 16 to receive the exterior thread 13 of the threaded sleeve 11. Prior to threadedly connecting the sleeve 11 with the sleeve 14, the insert member 18, the perforated plate insert 24 and the perforated disc set 27 are fitted into the threaded sleeve 14. An outwardly extending flange on the insert member 18 is in supportive engagement with the inwardly extending flange 17 on the threaded sleeve 14.

Inserted into the threaded sleeve 11 is the perforated disc set 29 having in its center a bushing 30 for receiving the operating rod or lever 31. A washer 28 is provided between the perforated plate insert 24 and the perforated disc set 27. In the area of the outlet opening, the threaded sleeve 11 has an inwardly projecting flange for supporting the perforated disc set 29, leaving the outlet 12 open.

The insert member 18 is adapted to receive a washer acting as the valve seat 23. The portion of the valve body 20 of the switch valve which faces the valve seat 23 is in the shape of a truncated cone and merges integrally with the stem 21. The stem 21 extends through a bore in the center of the perforated plate insert 24. Around the bore, the perforated plate 24 itself may be in the form of a sealing lip 25. The bottom end 22 of the stem 21 is constructed in the form of a plastic cap screwed onto the threaded portion of the stem 21. The plastic cap is held in the bushing 26 so as to be axially adjustable in the perforated disc set 27 and sits on top of the operating plate 33 of the operating lever 31. The operating lever 31 is securely retained by the operating plate 33 in the bushing 30 inserted in the perforated disc set 29. The bushing 30 is oval in cross section and its interior cross section increases toward the outlet opening.

The operating rod or lever 31 has disposed at its free end a return weight 32 which keeps the operating lever 31 in its illustrated initial position. The underside of the operating plate 33 lies on top of the bushing 30. The operating plate 33 merges with the operating rod 31 by way of concavely rounded transitional portions. Thus, the operating lever 31 is held in the bushing 30 in such a manner that it is movable in all directions. When the water faucet is open, the valve body 20 is pushed by the water against the valve seat 23. The switch valve of the device is closed.

Moving the operating lever 31 out of its perpendicular position causes the operating plate 33 to be tilted and the valve body 20, by way of the plastic cap and the stem 21, is thereby lifted from the valve seat 23. Thus, the switch valve of the device is open and the water flows through the valve seat 23 to the sealing lip 25 of the perforated plate insert 24. The water is forced to flow through the perforations 25 in the perforated plate insert 24 to the perforated disc set 27. The area of the plastic cap facing the sealing lip 25 of the perforated plate insert 24 is in the form of a cone-shaped closure 34 whereby an additional sealing effect is achieved in the region of the bore in the perforated plate 24 for the stem 21. The adjustment motion of the stem 21 can only be in the axial direction since the end portion 22 of the stem 21 in the shape of the plastic cap is fitted in the bushing 26 of the perforated disc set 27. In the open position of the switch valve, the perforated plate insert 24 effects a volume control and the distribution of water, while the perforated disc sets 27 and 29 produce a mixing of the water with air if additional air inlets are provided. Thus, the casing 10 accommodates, in addition to the switch valve, also an aerator (Perlator). The perforated plate insert 24 and the perforated disc sets 27 and 29 are also utilized to aid in the mounting and guidance of the valve body 20 and the operating lever 31. The operating lever 31 along with the operating plate 33 and the return weight 32 may be in the form of a unitary plastic part and, depending on the material, may itself be elastic.

The switch valve in the casing 10 is maintained in the open position only as long as the operating lever 31 is moved out of its original perpendicular position. The operating lever 31 is automatically returned to its original position by the return weight 32.

In a water faucet of the mixer type, the device according to the invention makes a turn-off valve itself unnecessary in the water faucet. It is sufficient to install adjustable mixing equipment in the faucet since the device of the invention controls the outflow of the water.

I claim:

1. Device for releasing the flow of water from a water faucet by a valve means enclosed within a casing (10) connectible at its inlet with said faucet opening, said valve means opening and closing said inlet opening with a valve body (20), said valve body (20) resting on a valve seat (23) facing said inlet opening of said casing (10) and actuated by operating lever (31) extending out of the outlet opening of said casing (10) and having an operating plate (33) within said casing and supported in the vicinity of said outlet opening of said casing so as to pivot in all directions removing said valve body (20) from said valve seat (23) by said pivot action, characterized in that said operating lever (31) is supported in a center bushing (30) of an annular perforated disc insert (29) covering said outlet opening of said casing (10) and is held suspended therein by said operating plate (33).

2. Device according to claim 1, characterized in that said valve body (20) is supported by said operating plate (33) of said operating lever (31) and said valve body has valve stem (21) which is axially movable in said casing (10).

3. Device according to claim 2, characterized in that said valve body (20) on the side facing said valve seat (23) is in the shape of a truncated cone and merges in one piece with said valve stem (21), that said valve stem (21) terminates in a threaded portion onto which a cap (34) is screwed forming end portion (22) which abuts the top of said operating plate (33) of said operating lever (31), and that said cap is axially movable in a bearing bushing (26).

4. Device according to claim 1, characterized in that said valve body (20) on the side facing said valve seat (23) is in the shape of a truncated cone and merges in one piece with the valve stem (21), that said valve stem (21) terminates in a threaded portion onto which a cap (34) is screwed forming end portion (22) which abuts the top of said actuating plate (33) of said operating lever (31), and that said cap is axially movable in a bearing bushing (26).

5. Device according to claim 4, characterized in that said valve seat (23) is in the form of a washer inserted into a recessed hole in an insert member (18), and that the insert member (18) is retained in said casing (10) made up of two threaded sleeves (11, 14).

6. Device according to claim 1, characterized in that said valve seat (23) is in the form of a washer inserted into a recessed hole in an insert member (18), and that said insert member (18) is retained in said casing (10) made up of two threaded sleeves (11, 14).

7. Device according to claim 1, characterized in that said valve body (20) has a stem (21) extending through a central bore in a perforated plate insert (24), said perforated plate insert (24) being constructed in the form of a cone-shaped closure by which the bore in said perforated plate insert (24) for receiving said stem (21) is sealed off when said valve body (20) is in the open position.

8. Device according to claim 7, characterized in that a perforated plate insert (24) itself forms a sealing lip (25) around a bore for said stem (21) of said valve body (20).

9. Device according to claim 1, characterized in that said bushing (30) in said perforated disc (29) located adjacent said outlet is oval in cross section and the interior cross section of said bushing (30) increases toward the discharge opening, and that the merging portion between said operating plate (33) and said operating lever (31) is concavely rounded.

10. Device according to claim 1, characterized in that the free end of said operating lever (31) takes the form of a return weight (32).

11. Device according to claim 1, characterized in that said casing (10) between said valve body (20) and a casing outlet perforated plate insert (24) for water volume control and perforated discs (27, 29) serving to promote mixing disposed in series in the direction of flow, that a stem (21) of said valve body (20) extends through a bore in said perforated plate insert (24) for water volume control and perforated discs (27, 29) serving to promote mixing disposed in series in the direction of flow, that said stem (21) of said valve body (20) extends through a bore in said perforated plate insert (24), that a cap (22) surrounding the end of said stem (21) is enclosed in bearing bushing (26) disposed in said perforated disc (27) toward said inlet.

12. Device for releasing the flow of water from a water faucet in which valve means are provided which are actuated by an operating member projecting from the discharge opening, in which a hollow casing having an inlet and an outlet opening is connectible to the discharge head of the water faucet, and in which the valve means comprise a valve body fitted in a valve seat to face said inlet opening and being adapted to be lifted off the valve seat by the action of said operating member, characterized in that a valve body (20) is separated from an operating member in the form of an operating lever (31) having one end portion facing said valve body (20) in the form of an operating plate (33) to securely retain said operating lever (31) in a casing (10) and to form a support for said valve body (20), and that said operating lever (31) is mounted in said casing (10) in the region of said operating plate (33) in such a manner that it is pivotable in any direction so that any deflecting motion performed by said operating lever (31) causes said valve body (20) to be lifted away from a valve seat (23) permitting flow of water therethrough, said casing (10) having between said valve body (20) and said casing outlet perforated plate insert (24) for water volume control and distribution and perforated discs (27, 29) serving to promote mixing disposed in series in the direction of flow, that a stem (21) of said valve body (20) extends through a bore in said perforated plate insert (24), that a cap surrounding end (22) of said stem (21) is enclosed in bearing bushing (26) disposed in said perforated disc (27) toward said inlet, and that said operating lever (31) is mounted in a bushing (30) in the central portion of said perforated disc (29) adjacent said outlet and is pivotable in all directions.

13. Device according to claim 12, characterized in that said valve body (20) has said stem (21) extending through a central bore in said perforated plate insert (24), said perforated plate insert (24) being constructed in the form of a cone-shaped closure by which the bore in said perforated plate insert (24) for receiving said stem (21) is sealed off when said valve body (20) is in the open position.

14. Device according to claim 13, characterized in that the free end of said operating lever (31) takes the form of a return weight (32).

15. Device according to claim 12, characterized in that said bushing (30) in said perforated disc (29) located adjacent said outlet is oval in cross section and the interior cross section of said bushing (30) increases toward the discharge opening, and that the merging portion between said operating plate (33) and said operating lever (31) is concavely rounded.

16. Device according to claim 15, characterized in that said perforated plate insert (24) itself forms a sealing lip (25) around the bore for said stem (21) of said valve body (20).

17. Device according to claim 12, characterized in that said perforated plate insert (24) itself forms a sealing lip (25) around the bore for said stem (21) of said valve body (20).

* * * * *